US011479099B2

(12) United States Patent
Hick et al.

(10) Patent No.: US 11,479,099 B2
(45) Date of Patent: Oct. 25, 2022

(54) WINDOW UNIT COMPRISING A GLAZING PANEL AND A FRAME

(71) Applicant: AGC GLASS EUROPE, Louvain-la-Neuve (BE)

(72) Inventors: Robert Hick, Chenee (BE); Roman Hynek, Teplice (CZ); Jiri Machacek, Teplice (CZ); Antonin Chaloupecky, Bilina (CZ)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 17/058,958

(22) PCT Filed: May 27, 2019

(86) PCT No.: PCT/EP2019/063667
§ 371 (c)(1),
(2) Date: Nov. 25, 2020

(87) PCT Pub. No.: WO2019/228992
PCT Pub. Date: Dec. 5, 2019

(65) Prior Publication Data
US 2021/0213816 A1 Jul. 15, 2021

(30) Foreign Application Priority Data

May 31, 2018 (EP) ..................................... 18175393

(51) Int. Cl.
*B60J 10/70* (2016.01)
*B60J 1/10* (2006.01)
(Continued)

(52) U.S. Cl.
CPC ................. *B60J 10/70* (2016.02); *B60J 1/10* (2013.01); *B29C 45/14434* (2013.01); *B29L 2031/7782* (2013.01); *B60J 1/007* (2013.01)

(58) Field of Classification Search
CPC ..................................... B60J 1/10; B60J 10/70
(Continued)

(56) References Cited

U.S. PATENT DOCUMENTS 5,944,324 A * 8/1999 Schultheis ........ B29C 45/14434
277/637
6,079,771 A * 6/2000 Brandner .................. B60J 10/82
200/61.43
(Continued)

FOREIGN PATENT DOCUMENTS

DE 197 44 385 A1 4/1998
EP 2 353 907 A1 8/2011
(Continued)

OTHER PUBLICATIONS

International Search Report dated Sep. 5, 2019 in PCT/EP2019/063667 filed on May 27, 2019.

*Primary Examiner* — D Glenn Dayoan
*Assistant Examiner* — Sunsurraye Westbrook
(74) *Attorney, Agent, or Firm* — Oblon, McClelland, Maier & Neustadt, L.L.P.

(57) ABSTRACT

A window unit for windows in motor vehicles and the like, including a glazing panel and a frame with a profile that encompasses at least partially the peripheral sides of the glazing panel. The frame includes a primary part which is in the form of a hard component and features an exterior profile where the primary part has at least one inner profile line with at least one notch and/or one protrusion extending from the peripheral side of the glazing panel to the center of the window unit. The primary part is capable of being fixed onto another object like a car body, a decorative object, a building, a door frame, or the like.

21 Claims, 5 Drawing Sheets

(51) Int. Cl.
  *B29C 45/14* (2006.01)
  *B29L 31/00* (2006.01)
  *B60J 1/00* (2006.01)

(58) Field of Classification Search
  USPC .................................................... 296/146.15
  See application file for complete search history.

(56) References Cited

U.S. PATENT DOCUMENTS

| | | | |
|---|---|---|---|
| 7,059,656 B2 * | 6/2006 | Mikkaichi | B60J 10/70 296/146.15 |
| 9,499,028 B2 * | 11/2016 | Kondo | B32B 37/1284 |
| 9,902,247 B2 * | 2/2018 | Zhou | B29C 45/14778 |
| 2004/0160090 A1 * | 8/2004 | Teschner | B32B 17/10247 296/211 |
| 2012/0292951 A1 | 11/2012 | De Bie | |
| 2015/0017368 A1 | 1/2015 | Kondou et al. | |
| 2016/0288633 A1 | 10/2016 | Zhou et al. | |

FOREIGN PATENT DOCUMENTS

| | | |
|---|---|---|
| EP | 2 835 244 A1 | 2/2015 |
| FR | 2 814 705 A1 | 4/2002 |
| WO | WO 2015/074581 A1 | 5/2015 |

* cited by examiner

WINDOW UNIT COMPRISING A GLAZING PANEL AND A FRAME

TECHNICAL FIELD

The present invention relates to a window unit for windows in motor vehicles and the like, comprising a glazing panel with a frame which has a frame profile and surrounding the edge of the window on at least two peripheral sides, wherein the frame grips the window or surrounds the window on at least two peripheral sides in the form of a ring which is enclosed in itself, and the frame comprises at least a primary part which is in the form of a hard component.

BACKGROUND ART

The injection of a primary part around a glazing panel can cause one of the major drawbacks is the presence of permanent force applied to the glazing panel. This effort is caused by the withdrawal related to the injection process of the primary part on the glazing panel and especially when the primary part is injected on the major part of peripheral sides of the glazing panel and due to the shrinkage of the primary part during the cooling step of the process of making the window unit.

Often, the glazing panel is not totally flat even has a defined curvature. The shrinkage of the primary part surrounding the edge of the window unit causes a narrowing of the primary part. Then, the primary part peels off the glazing panel by the same phenomenon as a bow that stretches. Thus, a gap between the primary part and the glazing panel occurs.

One solution to reduce this gap is to add in addition to a secondary part a primer material with a 2K process. The primer material is deposited on a surface of the glazing panel where the primary part will be not present. The secondary part is deposed on the primary part and on this surface to fix the primary part on the glazing panel. This increases the complexity of the process of fabrication and increases the cost. Furthermore, this solution is not applicable when the window unit is made only of hard material.

SUMMARY OF INVENTION

It is an object of the present invention to alleviate these problems, and to provide a window unit providing less constraint without or with a limited gap between the primary part and the glazing panel.

According to a first aspect of the invention, the invention relates to a window unit comprising a glazing panel, a frame which has a frame profile and encompasses at least partially the peripheral sides of the glazing panel, and the frame comprises a primary part which is in the form of a hard component and with an exterior profile.

The invention relates also to a method to produce a window unit according to a first aspect of the invention comprising a step to create the at least one notch on the glazing panel or a step to overmold the at least one protrusion with the primary part on the glazing panel or a step to inject the at least protrusion and the primary part on the glazing panel.

The invention relates also to a mold to produce a window unit according to a first aspect of the invention comprising a part to create at least one notch and/or at least one protrusion on the frame.

The solution as defined in the first aspect of the present invention is based on the primary part has at least one inner profile line with at least one notch (203) and/or the primary part has at least one protrusion extended from the exterior profile of the glazing panel to the center of the window unit and comprising at least one fixing mean. These components reduce or increase locally the width of the primary part and then reduces shrinkage effect and the gap between the primary part and the glazing panel is reduced even no gap is present.

In some embodiment, the inner profile with at least one notch doesn't have fixing mean. Fixing means can be inserted or overmolded elsewhere with the primary part.

Preferably, the notch comprises an opening on the inner profile and a cavity without hard material opened towards the center of the window unit via the opening. In some embodiment, the opening can be a slit on the inner profile. The cavity and the opening can have different dimensions. In a preferred embodiment, the slit is thinner than the dimension of the cavity to maximize the stiffness of the primary part and to avoid the creation of a gap between the primary part and the glazing panel.

In one embodiment, the frame comprises at least one notch and at least one protrusion.

Fixing means able to fix the window unit to another element like a car body, a decorative object, a door frame, . . . . Fixing elements are fixed on the frame within the primary part In one embodiment of the invention, the frame comprises an secondary part which is in the form of soft component, placed at least partially over the primary part. The secondary part allows to thigh the window unit on the structure where it is fixed. Such structure can be a car body, a building, . . . .

The secondary part can be injected in a second step over at least partially the primary part. Preferably, the secondary part is a single part. In some embodiments, the secondary part can be locally in contact with the glazing panel to ensure the aesthetic and the tightness of the window unit.

Preferably the at least one notch is on the inner profile of the frame and more preferably doesn't extend to the outer profile of the frame to keep the primary part in a single piece.

At least a bridge to release constraints by keeping the stiffness of the primary part can be added to the notch In case of a secondary part, this secondary part can maintain the bridge to keep mechanical properties and the effect of the bridge.

In a preferred embodiment, the hard component is a polypropylene based material. Other hard materials, with a young modulus higher than 1000 MPa, as polyamide, styrenic and others can be also used.

In a preferred embodiment, the soft component is a thermoplastic elastomer based material. Styrenic based and vulcanized thermoplastics elastomer are generally used. The soft component is in another embodiment a soft polyvinyl chloride.

In one embodiment of the invention, the primary part is in direct contact with the glazing panel meaning that the primary part is injected on the glazing panel. The glazing panel can have locally a bonding agent or primer material to ensure tightness and/or to promote the encapsulation of the primary part on the glazing panel.

The primary part can be overmolded on the glazing panel. To facilitate the process, the primary part can be injected into a mold to be encapsulated on the glazing panel. Preferably, the at least one protrusion and/or the at least one notch is created during the injection of the primary part.

Preferably to optimize the process and to reduce the price, the at least one protrusion is made of the same component than the primary part In one embodiment of the invention, the primary part is in direct contact with the glazing panel meaning that the primary part is injected on the glazing panel. The glazing panel can have locally a bonding agent or primer material to ensure tightness and/or to promote the encapsulation of the primary part on the glazing panel.

In one embodiment, the glazing panel is a glass panel. The glass panel comprises at least one glass sheet.

The glass sheet can be a clear glass or a coloured glass, tinted with a specific composition of the glass or by applying a coating or a plastic layer for example.

In another embodiment, the fixing element has a local overthickness to reinforce the fixation and reduce the gap between the primary part and the glazing panel.

To produce a window unit as described, the method comprises a step to create the at least one notch on the glazing panel or a step to overmold the at least one protrusion with the primary part (102a) on the glazing panel (101) or a step to inject the at least protrusion and the primary part (102a) on the glazing panel.

Avantageously, a specific mold comprising a part to create at least one protrusion and/or at least one notch on the frame is used during the process. This mold can have a part of a cavity to create the at least one protrusion and/or an element to create the notch. Another mold can have a part where the at least one protrusion is inserted to be overmolded with the glazing panel by the primary part.

The window element of the present invention may be arranged in a window frame or a door frame.

It is noted that the invention relates to all possible combinations of features recited in the claims.

The following description relates to an automotive window unit but it's understood that the invention may be applicable to others fields like architectural windows which may provide an encapsulation surrounding the edge of the window on at least two peripheral sides.

BRIEF DESCRIPTION OF DRAWINGS

This and other aspects of the present invention will now be described in more detail, with reference to the appended drawings showing various exemplifying embodiments of the invention which are provided by way of illustration and not of limitation. The drawings are a schematic representation and not true to scale. The drawings do not restrict the invention in any way. More advantages will be explained with examples.

DESCRIPTION OF EMBODIMENTS

Figure 1:
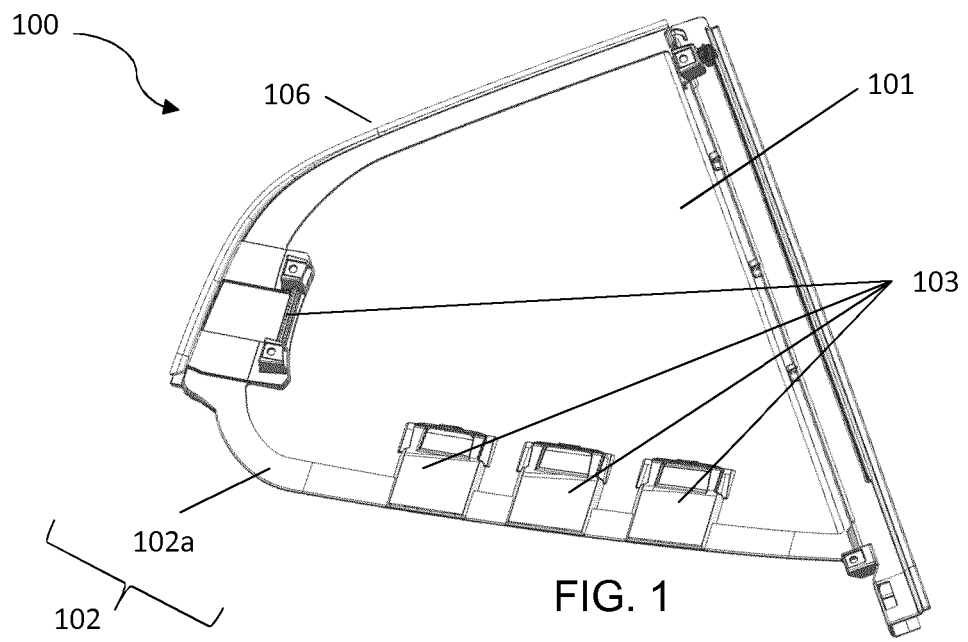
FIG. 1 is a schematic view of a window unit according to an exemplifying embodiment of the present invention.

With reference to FIG. 1, a first embodiment of the present invention is described.

FIG. 1 shows a window unit 100 comprising a glazing panel 101, a frame 102 which has a frame profile and encompasses the edge of the glazing panel 101 on at least two peripheral sides, and grips the glazing panel 101 or encompasses the glazing panel 101 on at least two peripheral sides in the form of a ring which is enclosed in itself and the frame 102 comprises a primary part 102a extended from the exterior profile 106 of the glazing panel 101 to the center of the window unit. The primary part 102a of the frame 102 comprises protrusions 103. The hard material is a polypropylene based material.

Figure 2:
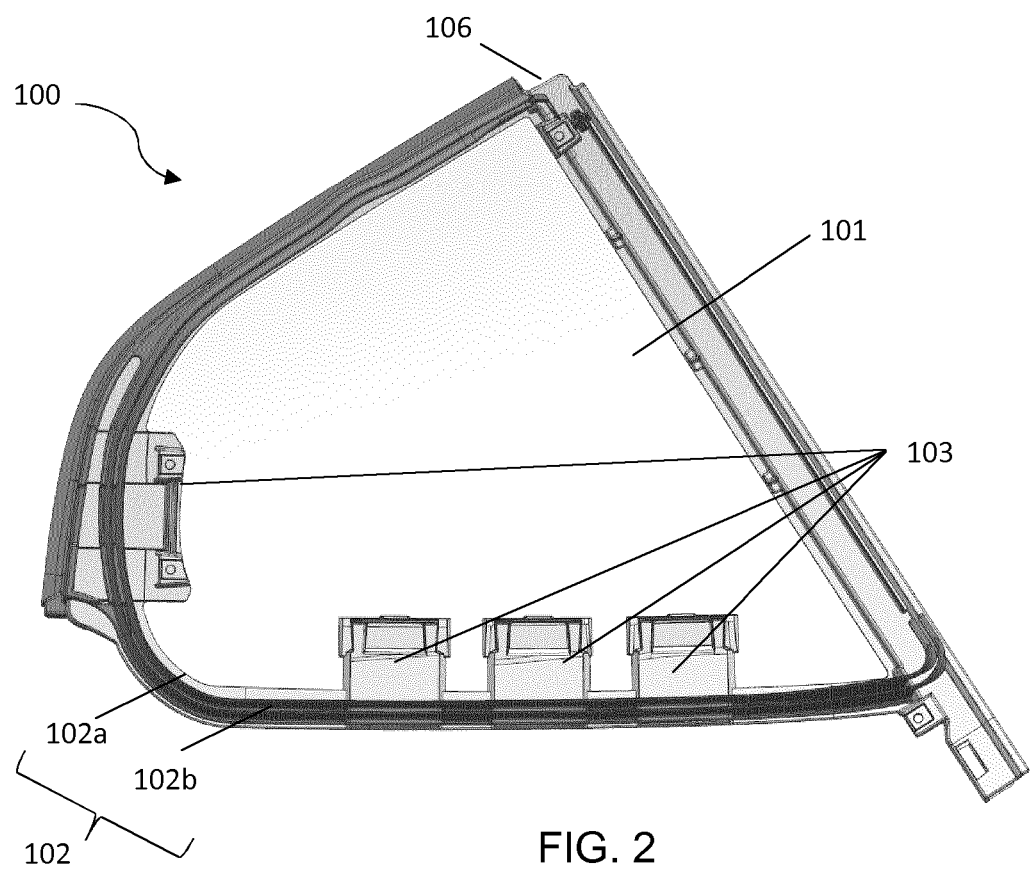
FIG. 2 is a schematic view of a window unit of FIG. 1 wherein the frame comprises an secondary part which is in the form of soft component.

FIG. 2 shows the window unit 100 described in FIG. 1 but where the frame comprises also a secondary part 102b which is in the form of soft component, placed at least partially over the primary part. In this embodiment, the soft component is a thermoplastic elastomer based material. The secondary part 102b owns lips to ensure tightness of the window unit 100.

Figure 3:
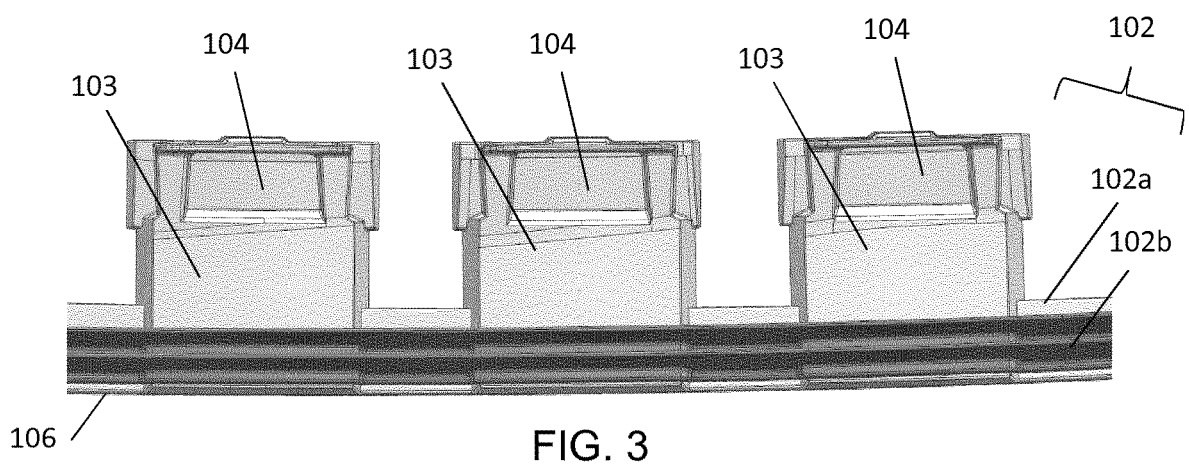
FIG. 3 is a schematic view of protrusions according to the invention.

FIG. 3 shows protrusions 103 comprising at least one fixing mean 104 in particular embodiment of the invention. Protrusions extended from the exterior profile 106 of the glazing panel 101 to the center of the window unit 100. Over a part of the primary part 102a, the secondary part 102b is overmolded with lips. A local over thickness of protrusions 103 regarding the primary part allows to reinforce the primary part and prevent a gap between the glazing panel and the primary part 102a.

Figure 4:
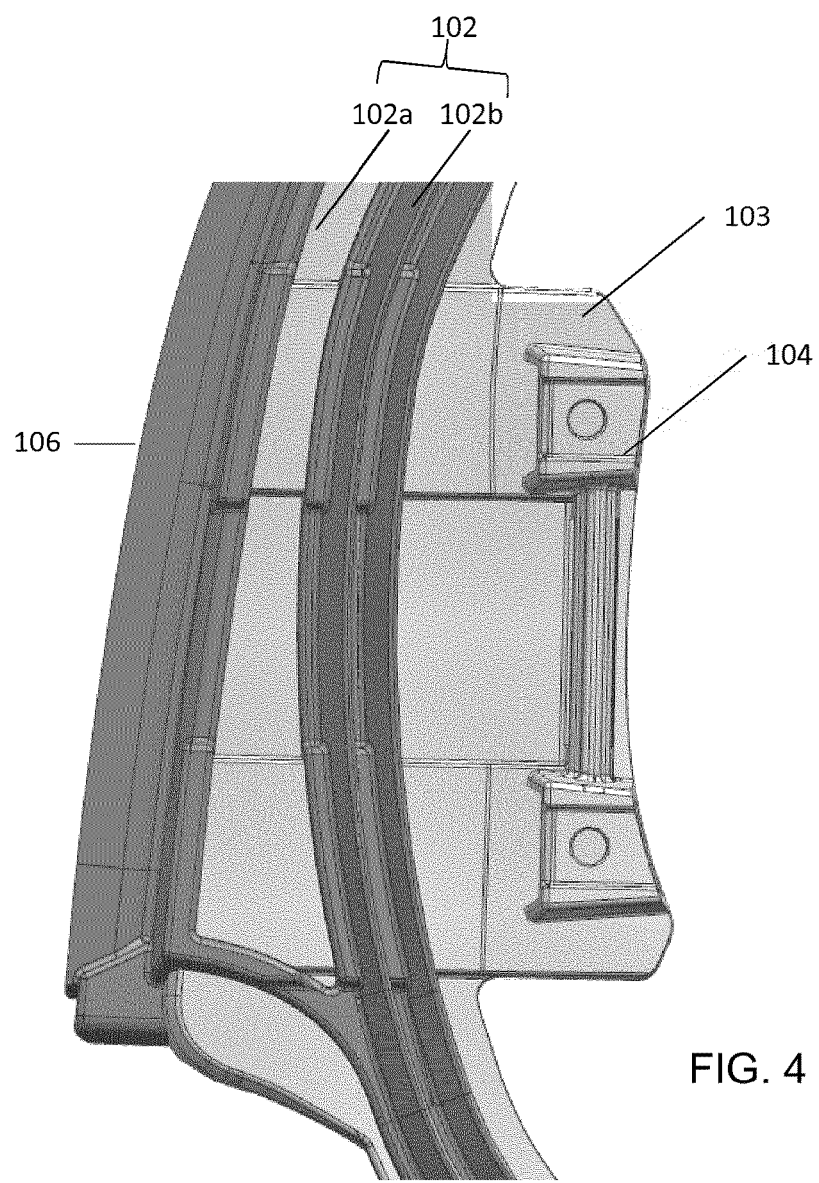
FIG. 4 is a schematic view of protrusions according to the invention.

FIG. 4 shows a protrusion 103 comprising at least one fixing mean 104 in particular embodiment of the invention. Protrusions extended from the exterior profile 106 of the glazing panel 101 to the center of the window unit 100. Over a part of the primary part 102a, the secondary part 102b is overmolded with lips. A local over thickness of protrusions 103 regarding the primary part allows to reinforce the primary part and prevent a gap between the glazing panel and the primary part 102a.

Figure 5:
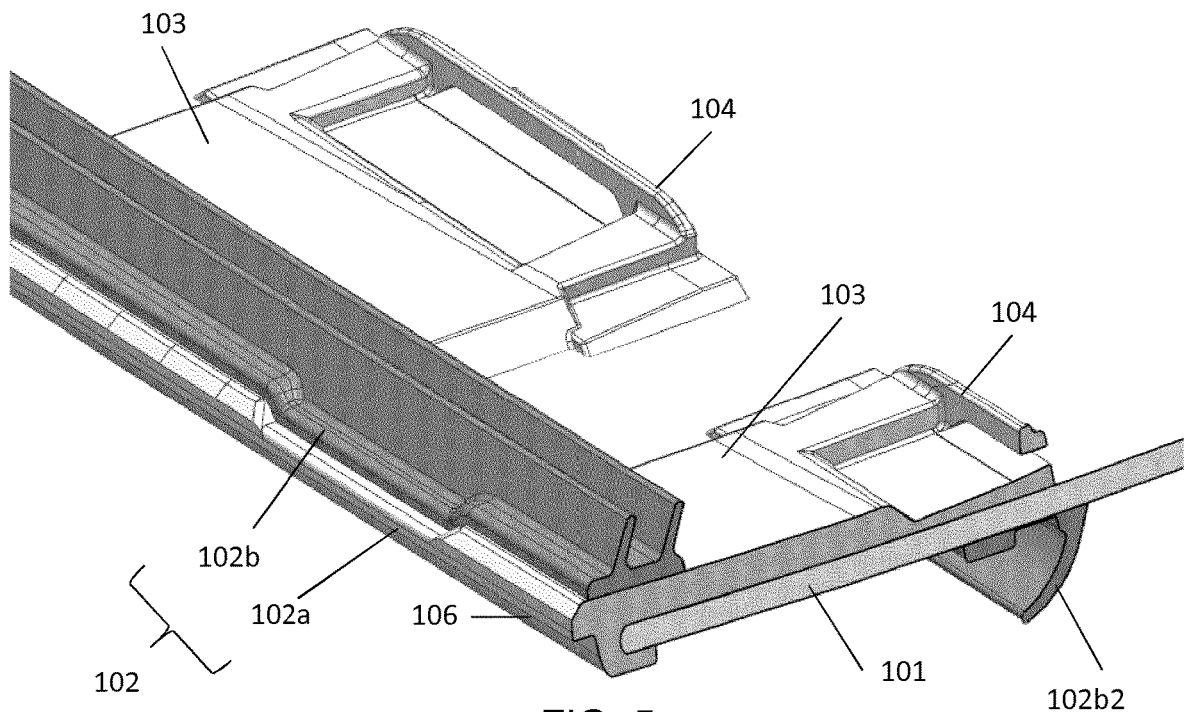
FIG. 5 is a sectional view of a window unit with protrusions according to the invention.

FIG. 5 shows a sectional part of a window unit 100 with protrusions 103 comprising at least one fixing mean 104 in particular embodiment of the invention. Protrusions extended from the exterior profile 106 of the glazing panel 101 to the center of the window unit 100. Over a part of the primary part 102a, the secondary part 102b is overmolded with lips. A local over thickness of protrusions 103 regarding the primary part allows to reinforce the primary part and prevent a gap between the glazing panel and the primary part 102a.

The primary part 102a encompasses the glazing panel 101 and the secondary part 102b is injected over a part of the primary part 102a and directly on the glazing panel in another part 102b2.

Figure 6:
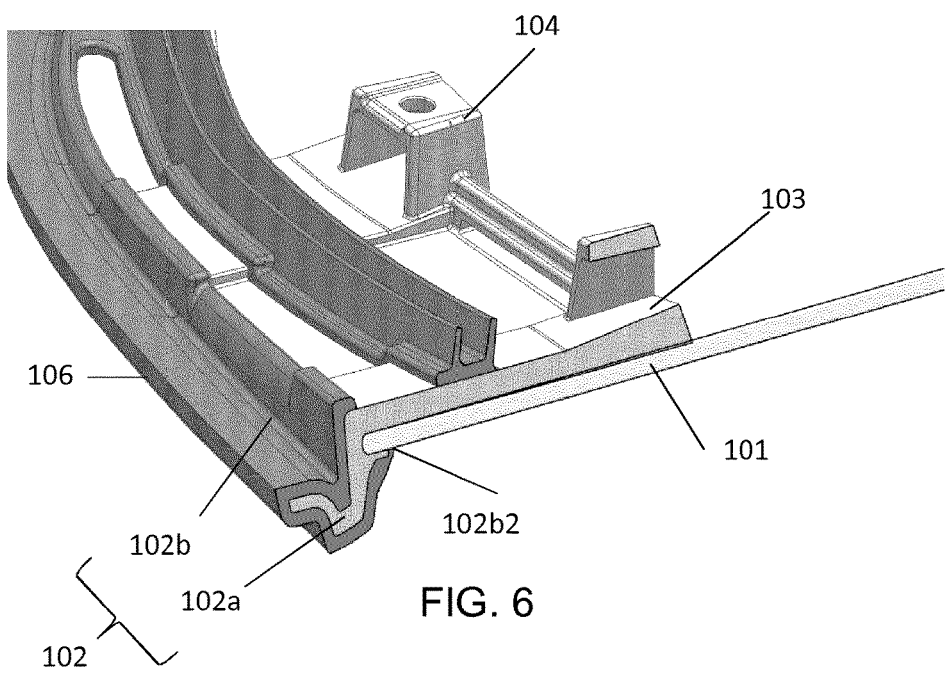
FIG. 6 is a sectional view of a window unit with protrusions according to the invention.

FIG. 6 shows a sectional part of a window unit 100 with protrusions 103 comprising at least one fixing mean 104 in particular embodiment of the invention. Protrusions extended from the exterior profile 106 of the glazing panel 101 to the center of the window unit 100. Over a part of the primary part 102a, the secondary part 102b is overmolded with lips. A local over thickness of protrusions 103 regarding the primary part allows to reinforce the primary part and prevent a gap between the glazing panel and the primary part 102a.

The primary part 102*a* encompasses the glazing panel 101 and the secondary part 102*b* is injected over a part of the primary part 102*a* and directly on the glazing panel in another part 102*b*2

Figure 7:
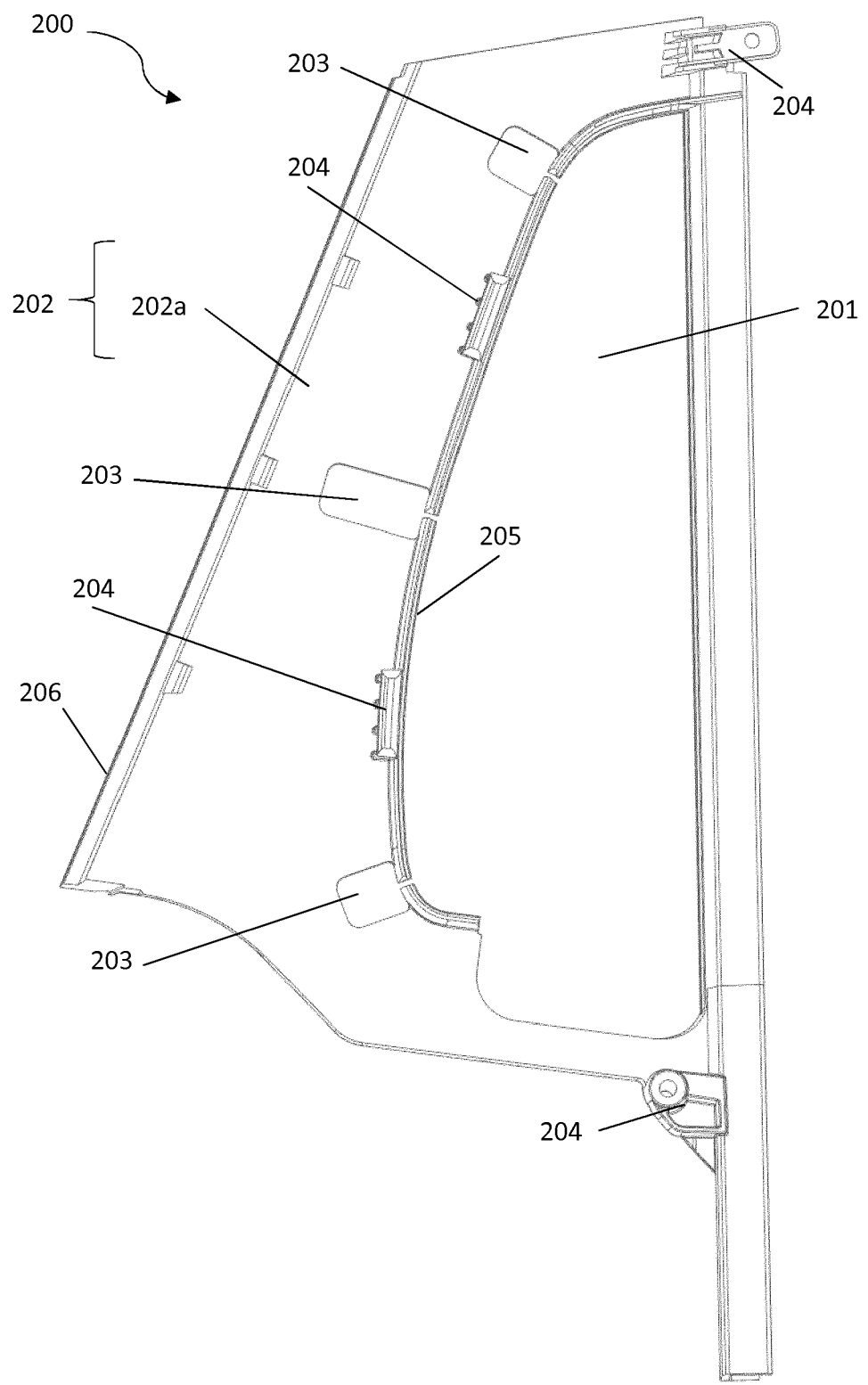
FIG. 7 is a schematic view of a window unit according to an exemplifying embodiment of the present invention.
Figure 8:
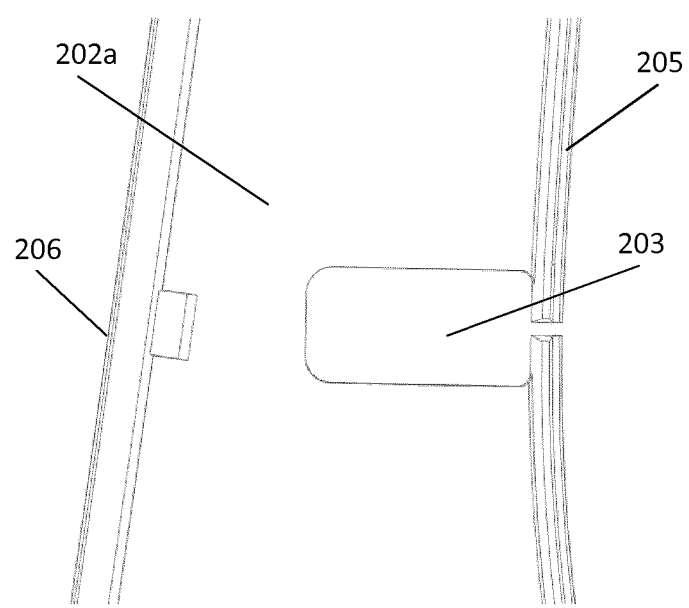
FIG. 8 is a schematic view of a window unit with a notch according to the invention.

FIG. 7 shows a another embodiment of the invention of a window unit 200 with a frame 202 comprising notches 203. FIG. 8 shows a detailed notch according to one embodiment of the invention.

The frame 202 comprises a exterior profile 206 and an inner profile 205. Some fixing means 204 are used to fix the window unit 200 on a support, a car body for example. Some fixing mean are placed near the inner profile 205 and some other are on the primary part 202*a*. The inner profile 205 owns notches 203. In this example, notches are not extend on the external profile 206.

In this embodiment, the notch 203 comprises a cavity 203*a* and an opening 203*b* in a form of a slit on the inner profile 205 of the primary part 202*a*. The width of the slit 203*b* is smaller than dimensions of the cavity 203*a*. Forces applied on the primary part 202*a* and induced on the glazing panel 201 shrinkage of the primary part are reduced due to the cavity and the slit. Thus, a reduced gap even no gap exists between the primary part 202*a* and the glazing panel 201.

The notch are made by an element in the mold. This element prevents the hard material to be injected in this region.

The invention claimed is:

1. A method of producing a window unit, the window unit comprising:
    a glazing panel and,
    a frame with a frame profile that encompasses at least partially peripheral sides of the glazing panel
    wherein the frame comprises a primary part in the form of a hard component with an exterior profile, and
    wherein the primary part has at least one inner profile line with at least one notch,
    the method comprising creating the at least one notch on the glazing panel.

2. The method of producing the window unit according to claim 1, wherein the frame comprises an secondary part which is in the form of a soft component, placed at least partially over the primary part.

3. The method of producing the window unit according to claim 2, wherein the soft component is a thermoplastic elastomer based material.

4. The method of producing the window unit according to claim 1, wherein the hard component is a polypropylene based material.

5. The method of producing the window unit according to claim 1, wherein the primary part is in direct contact with the glazing panel.

6. The method of producing the window unit according to claim 1, wherein the glazing panel is a glass panel.

7. The method of producing the window unit according to claim 1, wherein the glazing panel is a laminated glass panel.

8. The method of producing the window unit according to claim 4, wherein the hard component is a polypropylene based material.

9. The method of producing the window unit according to claim 1, wherein the fixing element has a local over thickness.

10. The method of producing the window unit according to claim 1, wherein the notch comprises a cavity in the primary part and a slit on the inner profile.

11. The window unit produced according to the method of claim 1.

12. A mold to produce a window unit, the window unit comprising:
    a glazing panel and,
    a frame with a frame profile that encompasses at least partially peripheral sides of the glazing panel,
    wherein the frame comprises a primary part in the form of a hard component with an exterior profile, and
    wherein the primary part has at least one inner profile line with at least one notch and/or at least one protrusion extending from the exterior profile of the glazing panel to a center of the window unit and comprising at least one fixing means,
    the mold comprising a part to create the at least one notch and/or the at least one protrusion on the frame.

13. A method of producing a window unit, the window unit comprising:
    a glazing panel and,
    a frame with a frame profile that encompasses at least partially peripheral sides of the glazing panel,
    wherein the frame comprises a primary part in the form of a hard component with an exterior profile, and
    wherein the primary part has at least one protrusion extending from the exterior profile of the glazing panel to a center of the window unit and comprising at least one fixing means,
    the method comprising
        overmolding the at least one protrusion with the primary part on the glazing panel, or
        injecting the at least one protrusion and the primary part on the glazing panel.

14. The method to produce the window unit according to claim 12, comprising overmolding the at least one protrusion with the primary part on the glazing panel.

15. The method to produce the window unit according to claim 13, comprising injecting the at least one protrusion and the primary part on the glazing panel.

16. The method of producing the window unit according to claim 13, wherein the frame comprises a secondary part which is in the form of a soft component, placed at least partially over the primary part.

17. The method of producing the window unit according to claim 13, wherein the hard component is a polypropylene based material.

18. The method of producing the window unit according to claim 13, wherein the soft component is a thermoplastic elastomer based material.

19. The method of producing the window unit according to claim 13, wherein the primary part is in direct contact with the glazing panel.

20. The method of producing the window unit according to claim 13, wherein the glazing panel is a glass panel.

21. The method of producing the window unit according to claim 13, wherein the glazing panel is a laminated glass panel.

* * * * *